United States Patent Office 2,694,087
Patented Nov. 9, 1954

2,694,087

HYDROXY ARALKYLENE ETHERS OF ARYL SULFONIC ACIDS

Peter S. Petrie and Edgar C. Britton, Midland, Mich., assignors to The Dow Chemical Company, Midland, Mich., a corporation of Delaware No Drawing. Application October 26, 1951, Serial No. 253,466

6 Claims. (Cl. 260—512)

The present invention relates to hydroxy aralkylene ethers of aryl sulfonic acids, to methods of producing the same, and the utilization of these compounds as emulsifying agents.

These new compounds correspond to the following general formula:

$$M[SO_3-R-O-(R'CHCH_2O)_nH]_m$$

wherein R is an aromatic hydrocarbon radical consisting of a benzene nucleus having as the sole hydrocarbon substituents not more than three lower alkyl groups and not more than one phenyl group attached thereto; R' is a mononuclear aromatic hydrocarbon radical; M represents a member of the group consisting of hydrogen, alkali metals, alkaline earth metals, ammonium and substituted ammonium radicals; $m$ is a number equal to the valence of M; and $n$ is an integer. According to the invention, these compounds may be formed by condensing an aralkylene oxide, such as styrene oxide, corresponding to the general formula $$R'-CH-CH_2 \atop \diagdown O \diagup$$

with a hydroxy aryl sulfonic acid, for example, a phenol sulfonic acid or a sodium phenol sulfonate, corresponding to the general formula $M[SO_3-ROH]_m$ wherein the symbols R, R', M, and $m$ are as defined above.

Typical of the aralkylene oxides which may be condensed with hydroxy aryl sulfonic acids are styrene oxide and substituted styrene oxides which have one or more lower alkyl substituents as illustrated by the following examples: o-, m-, or p-methylstyrene oxides, α-methyl styrene oxide, ar-dimethylstyrene oxides, p-ethyl styrene oxide, p-isopropylstyrene oxide, etc.

Examples of suitable hydroxy aryl sulfonic acids are phenol sulfonic acid, o-, m-, or p-cresol sulfonic acids, p-isopropylphenol sulfonic acid, phenylphenol sulfonic acids, etc. In fact, any hydroxy benzene sulfonic acid having alkyl or aryl nuclear substituents may be used.

The condensation reaction may be catalyzed with acidic or basic catalysts, such as caustic soda, caustic potash, sodium ethylate, mineral acids, organic acids, etc. Since the alkali salts of hydroxy aryl sulfonic acids are preferred reactants, alkali oxides or hydroxides are usually employed as catalysts in amounts corresponding to 0.1 to 1.0 per cent by weight of the reactants, although somewhat larger amounts of catalyst may be used. The temperature of the condensation is adjusted to suit the particular reactants and is in the range of 100 to 250° C. with 125 to 175° C. preferred. Superatmospheric pressures may advantageously be employed especially when a low boiling liquid is used as a solvent. Pressures in the range of 50 to 500 pounds per square inch gauge or higher may be used, although pressures more nearly approximating the lower limit are usually adequate. Solvents, such as benzene, toluene, or xylene may be used to advantage, particularly when one or both of the reactants are solid at or near the preferred temperature for carrying out the reaction. Conditions which are essentially anhydrous favor the formation of ethers of alkali phenol sulfonates rather than the formation of aralkylene glycols and low molecular weight polyaralkylene glycols. The duration of run is dependent on the reactants as well as the conditions of the reaction, although in general, reaction for several hours within the range of preferred conditions will give good conversions and yields.

The preferred method of operation is to agitate and heat a benzene solution of a salt of a phenol sulfonic acid, such as sodium phenol sulfonate, together with an alkali hydroxide catalyst and the desired amount of aralkylene oxide, e. g. styrene oxide, for a period of several hours. From 1 to 10 or more moles of the aralkylene oxide may be reacted per mole of the salt of a phenol sulfonic acid.

The condensation products obtained by this process are, for the most part, transparent, glassy solids which range in color from almost colorless to deep amber. The hydroxy aralkylene ethers of aryl sulfonic acids and particularly the alkali metal salts of these compounds, as well as the salts with organic and quaternary ammonium bases, are soluble in water. They are especially useful as agents for wetting, emulsifying, dispersing, penetrating, spreading, etc.

In order to illustrate more fully this invention, the following examples are given for the condensation of styrene oxide with hydroxy aryl sulfonates to give compounds corresponding to the general formula $$NaSO_3-C_6H_4-O-(C_6H_5CHCH_2O)_nH$$

and $$NaSO_3-C_6H_3(C_6H_5)-O-(C_6H_5CHCH_2O)_nH$$

wherein $n$ is an integer from 1 to 10.

Example 1

Into a 2-liter stainless steel bomb was charged the following:

196 grams (1.0 mole) sodium phenol-4-sulfonate
240 grams (2.0 moles) styrene oxide
2 grams (0.05 mole) powdered NaOH
500 ml. benzene as solvent The bomb was sealed and heated at a temperature of 130 to 135° C. and a pressure of 55 to 60 p. s. i. g. for four hours. The crude reaction product, which was a solid at room temperature, was heated at 90° C. and 40 mm. Hg pressure absolute to remove the benzene, leaving 425 grams of a water-soluble white powder which was chiefly the condensation product of sodium phenol sulfonate and styrene oxide. A 100 gram sample of this material was stirred for two hours with 500 ml. of benzene to extract any mono- or polystyrene oxide unreacted with sodium phenol sulfonate. The dry purified powder weighing 84 grams was completely soluble in water, slightly soluble in acetone, and insoluble in benzene or kerosene. On heating, the powder remained solid below 150° C. but became a thick paste at 200° C. The average molecular weight, calculated from sulfur analysis, was 372 indicating that 1.5 moles of styrene oxide had reacted per mole of sodium phenol sulfonate.

Example 2

The following materials were placed in a stainless steel bomb as in Example 1:

90 grams (0.45 mole) sodium phenol-4-sulfonate
540 grams (4.5 moles) styrene oxide
4.5 grams (0.125 mole) powdered NaOH
450 ml. benzene as solvent The reactants were heated with agitation to 155–160° C. at 55–60 p. s. i. g. for 4.5 hours in a sealed bomb. After cooling the contents of the bomb to room temperature, 123 grams of a low molecular weight polymer of styrene oxide and sodium phenol-4-sulfonate was removed by filtration. The filtrate was then concentrated during vacuum distillation by the removal of benzene and 210 grams of a styrene oxide fraction. The distillation was stopped at a still pot temperature of 150° C. at 5 mm. Hg absolute. Approximately 285 grams of a non-volatile material remained as a residue which solidified below 50° C. to a brittle transparent amber solid, soluble in water, acetone, benzene and xylene but insoluble in kerosene. This water-soluble resinous condensate of sodium phenol sulfonate and styrene oxide was found to have an average molecular weight of 975 as determined by freezing point lowering in benzene, which corresponds to a product with a chain of 6 to 7 styrene oxide units per molecule of sodium phenol sulfonate.

Example 3

A 2-liter stainless steel bomb was charged as follows:
124 grams (0.4 mole) sodium sulfonate of 2-phenylphenol
490 grams (4.1 moles) styrene oxide
4.0 grams (0.1 mole) powdered NaOH
500 ml. benzene as solvent The reaction procedure was similar to that of Examples 1 and 2 except that the reactants were heated for 6 hours at 150–175° C. The resinous reaction product was a solid below 70° C., a thick grease at 85° C., and a liquid at 100° C. It was slightly soluble in benzene or xylene, sparingly soluble in water, and insoluble in kerosene. The average molecular weight of the resin calculated from sulfur analysis was 1515 indicating that styrene oxide had reacted with sodium 2-phenylphenol sulfonate in an approximate mole ratio of 10 to 1.

The condensation products of Examples 1, 2 and 3 were tested as emulsifiers in three formulations. For every test, an immiscible liquid such as ethylene dibromide, isooctyl alcohol or a mineral oil formulation, was shaken with water in which was dissolved a given amount of emulsifier. The mixture was then passed through a hand homogenizer and allowed to stand undisturbed while the time interval required for the emulsion to separate into layers was observed. Details of the various tests are described below.

Example 4

To demonstrate that the compounds of the present invention are exceptional emulsifiers, tests were run to compare the condensation products of Examples 2 and 3 with other polyglycol ethers of sodium phenol sulfonates not in accord with the invention. In each case, 2.18 grams of emulsifier was dissolved in a 50 ml. portion of water. After 10 ml. of ethylene dibromide was added to each solution, the mixtures were well shaken and passed twice through a hand homogenizer to thoroughly emulsify the ethylene dibromide. The emulsifier and time required for complete separation are recorded in the following table. The formulas indicate the average number of units in the polyglycol chain.

| | |
|---|---|
| Product of Example 2 | Greater than 40 hours. |
| Product of Example 3 | Greater than 40 hours. |
| $HO(C_3H_6O)_{10}.C_6H_4.SO_3Na$* | Less than 24 hours. |
| $HO(C_3H_6O)_{10}.C_6H_3(C_6H_5).SO_3Na$* | 20 minutes. |
| $HO(C_2H_4O)_{10}.C_6H_4.SO_3Na$* | 0 to 10 seconds. |
| $HO(C_2H_4O)_{1-2}.C_6H_4.SO_3Na$* | 0 to 10 seconds. |

* Not according to invention.

Example 5

A 10 ml. portion of isooctyl alcohol was emulsified with each of the solutions of 0.83 gram of the following condensation products in 50 ml. portions of water according to the procedure outlined in Example 4. The time required for complete separation is recorded below:

| | |
|---|---|
| Product of Example 2 | Greater than 96 hours. |
| Product of Example 1 | 96 hours. |
| Product of Example 3 | 96 hours. |
| $HO(C_2H_4O)_{10}.C_6H_3(C_6H_5).SO_3Na$* | 6 hours. |
| $HO(C_3H_6O).C_6H_4.SO_3Na$* | 30 minutes. |
| $HO(C_2H_4O)_{1-2}.C_6H_4.SO_3Na$* | 5 minutes. |

* Not according to invention.

Example 6

Solutions of each of the condensation products listed in the following table were prepared by dissolving 1.02 grams of the condensate in 50 ml. of water. To each solution was added a 10 ml. portion of a mixture composed of 50–50 weight per cent mineral oil (Shell E-407) and the isopropyl ester of 2,4-dichlorophenoxy acetic acid. Emulsions were prepared and the time recorded for separation into layers.

| | |
|---|---|
| Product of Example 1 | Greater than 96 hours. |
| Product of Example 2 | Greater than 96 hours. |
| Product of Example 3 | Greater than 96 hours. |
| $HO(C_2H_4O)_{10}.C_6H_3(C_6H_5).SO_3Na$* | 1 hour. |
| $HO(C_2H_4O)_{10}.C_6H_4.SO_3Na$* | 5 minutes. |
| $HO(C_2H_4O)_{1-2}.C_6H_4.SO_3Na$* | 5 seconds. |

* Not according to invention.

We claim.

1. New compounds corresponding to the following general formula $$M[SO_3-R-O-(R'CHCH_2O)_nH]_m$$

wherein R is an aromatic hydrocarbon radical consisting of a benzene nucleus having as the sole hydrocarbon substituents not more than three lower alkyl groups and not more than one phenyl group attached thereto; R' is a mononuclear aromatic hydrocarbon radical having as the sole substituents thereon no more than two lower alkyl groups; M represents a member of the group consisting of hydrogen, alkali metals, alkaline earth metals, ammonium and substituted ammonium radicals; $m$ is a number equal to the valence of M; and $n$ is an integer from 1 to 10.

2. New compounds according to claim 1 wherein R' is phenyl and M is an alkali metal.

3. New compounds according to claim 2 wherein R is phenylene.

4. New compounds according to claim 2 wherein R is phenyl-phenylene.

5. Compounds having the general formula $$NaSO_3-C_6H_4-O-(C_6H_5CHCH_2O)_nH$$

wherein $n$ is an integer from 1 to 10.

6. Compounds having the general formula $$NaSO_3-C_6H_3(C_6H_5)-O-(C_6H_5CHCH_2O)_nH$$

wherein $n$ is an integer from 1 to 10.

References Cited in the file of this patent

UNITED STATES PATENTS

| Number | Name | Date |
|---|---|---|
| 2,057,018 | Bruson et al. | Mar. 30, 1937 |
| 2,176,833 | Bruson et al. | Oct. 17, 1939 |
| 2,184,935 | Bruson et al. | Dec. 26, 1939 |
| 2,422,637 | Thomas | June 17, 1947 |

FOREIGN PATENTS

| Number | Country | Date |
|---|---|---|
| 631,017 | Germany | June 10, 1936 |